United States Patent [19]

Payne et al.

[11] Patent Number: 5,795,364
[45] Date of Patent: Aug. 18, 1998

[54] REBURNING GLASS FURNACE FOR INSURING ADEQUATE MIXING OF GASES TO REDUCE $NO_X$ EMISSIONS

[75] Inventors: Roy Payne; David K. Moyeda, both of Mission Viejo, Calif.

[73] Assignee: Gas Research Institute

[21] Appl. No.: 551,402

[22] Filed: Nov. 1, 1995

[51] Int. Cl.$^6$ .................................................. C03B 5/16
[52] U.S. Cl. ............................ 65/158; 65/160; 65/29.13; 65/134.6; 65/335; 65/337; 432/72; 432/180; 432/181
[58] Field of Search .................... 65/347, 346, 337, 65/335, 134.6, 134.1, 134.4, 29.13, 355, 356, 324, 325, 157, 29.12, 158, 160; 432/180, 181, 159, 163, 72, 193, 200, 19, 47

[56] References Cited

U.S. PATENT DOCUMENTS

| | | | |
|---|---|---|---|
| 3,511,630 | 5/1970 | Hickey | 65/347 |
| 3,515,529 | 6/1970 | Love et al. | 65/337 |
| 3,856,496 | 12/1974 | Nesbitt et al. | 65/29.13 |
| 4,347,072 | 8/1982 | Nagaoka et al. | 65/27 |
| 4,372,770 | 2/1983 | Krumwiede et al. | 65/27 |
| 4,375,235 | 3/1983 | Tsai | 432/181 |
| 4,496,315 | 1/1985 | Savolskis | 432/181 |
| 4,496,316 | 1/1985 | Tsai | 432/181 |
| 4,506,726 | 3/1985 | Tsai | 432/181 |
| 4,599,100 | 7/1986 | Demarest, Jr. | 65/134.6 |
| 5,238,396 | 8/1993 | Yap | 431/10 |
| 5,417,731 | 5/1995 | Leblanc et al. | 65/134.6 |

FOREIGN PATENT DOCUMENTS

| | | | |
|---|---|---|---|
| 62-42861 | 9/1987 | Japan | 65/134.6 |

OTHER PUBLICATIONS

"Glass Tank $NO_x$ Emission Control With Gas Reburn"—J. Pont et al., published by Gas Research Institute, Mar. 1994.

Pulse Combustion:Impinging Jet Heat Transfer Enhancement, *Combust. Sci. and Tech.*, 1993, vol. 94, pp. 147–165.

Measurement of the Optical Properties of Coal–Derived and Propane–Derived Soot in a Flat Flame Reactor; J. Rigby and B. Webb, Mech. Eng. Dept., Brigham Young Univ. and T. Fletcher, Chem. Eng. Dept., Brigham Y. U.

Heat Transfer Optimization in TV Glass Furnaces; pp. 141–151; W. J. Horan, Techneglas, Inc. and A.G. Slavejkov and L.L. Chang, Air Products and Chemicals, Inc.

Flue Gas Heat Recovery in Glass Furnaces, Reprinted From *Glass*, Nov. 1983, P. Bony.

(List continued on next page.)

*Primary Examiner*—Steven P. Griffin
*Attorney, Agent, or Firm*—Thomas, Kayden, Horstemeyer & Risley, L.L.P.

[57] ABSTRACT

A mixing method insures adequate mixing of gases in a glass furnace that employs a reburning process. Because of the mixing method, a novel glass furnace can be constructed that strikes an optimum balance between a reduction in nitrogen oxide ($NO_x$) emissions and the cost of the reburn process, particularly, the number of requisite reburn and overfire air jets as well as reburn fuel. The glass furnace is constructed as follows. A combustion housing defines a primary zone for receiving combustible fuel, a reburn zone connected to the primary zone for receiving exhaust from the primary zone and reburn fuel to generate a first gas mixture. A burnout zone is connected to the reburn zone and receives the first gas mixture and overfire air to generate a second gas mixture. In accordance with the mixing method, one or more reburn jets provide reburn fuel to the reburn zone so that the fuel stoichiometric ratio observed at multiple locations in a first measurement plane of the first gas mixture residing substantially at an exit to the reburn zone is characterized by a first coefficient of variation (COV) that is about 0.4, and further, one or more overfire air jets provides air to the overburn zone so that a second measurement plane of the second gas mixture residing substantially at an exit of the burnout zone is characterized by a second coefficient of variation that is 0.4.

10 Claims, 8 Drawing Sheets

OTHER PUBLICATIONS

Thermal Performance of Cruciform Regenerator Packings, Reprinted from *Glass*, Mar., 1990, A. Zanoli, E.R. Begley, R. Videl and D. Lagarenne.

The Influence of the Thermal Properties of Refractories and Their Mode of Utilisation on the Heat Balance in Regenerators, Glass Technology, vol. 21, No. 4, Aug., 1980, J. Delrieux.

REBURNING GLASS FURNACE FOR INSURING ADEQUATE MIXING OF GASES TO REDUCE NO$_X$ EMISSIONS

FIELD OF THE INVENTION

The present invention generally relates to combustion furnaces, and more particularly, to a method for insuring adequate mixing of gases in a glass furnace that implements a reburning process and to a reburning glass furnace and associated method that utilize the novel mixing method. The novel reburning glass furnace and associated method strike an optimum balance between a reduction in nitrogen oxide (NO$_x$) emissions and the cost of the reburn process, particularly, the number of requisite reburn and overfire air jets as well as reburn fuel.

BACKGROUND OF THE INVENTION

Glass furnaces produce high concentrations of oxides of nitrogen (NO$_x$) due to the high combustion temperatures required to melt the glass batch materials. Since increasingly stringent air quality regulations are forcing the glass industry to reduce emissions of NO$_x$, there is significant interest in technologies which can be applied to glass furnaces to achieve high levels of emissions control in a cost effective manner.

Gas reburning is a NO$_x$ control technology which can be used to control emissions from virtually any continuous emission source. It is not fuel specific and can be applied to equipment fired with coal, oil, gas, biomass, or waste fuels. Some of the principal applications where gas reburning can effectively be applied are utility boilers, industrial boilers, process eaters, incinerators, furnaces, and kilns. A significant amount of the work on the reburn process to date has focused on coal-fired utility boilers, where gas reburning has successfully been demonstrated to provide control levels between 60 to 70 percent. In this regard, see Folsom et al., "Reducing Stack Emissions by Gas Firing Coal-Designed Boilers-Field Evaluation Results," 1993 Joint EPA/EPRI Symposium on Stationary Combustion NO$_x$ Control, Miami Beach, Fla., May 24–26, 1993.

This emphasis has been due to the need to control acid rain precursors (i.e., NO$_x$ and SO$_2$) from these systems. In a previous study by Moyeda et al., "Application of Gas Reburning Technology to Glass Furnaces for NO$_x$ Emissions Control," presented at the AFRC/JFRC Pacific Rim International Conference on Environmental Control of Combustion Processes, Maui, Hi., Oct. 16–30, 1994, it was demonstrated that gas reburning technology is expected to be applicable to glass furnaces employed in the manufacturing of flat, container, and fiber glass in both technical and economic respects. In fact, gas reburning appears ideal for glass furnace since the NO$_x$ control performance of the process is best at the high temperatures and NO$_x$ concentrations typical of glass furnace operation.

FIGS. 1A and 1B illustrate the reburn process. As shown in FIG. 1A, the reburn process 11 divides the combustion pathway into three zones 12, 13, 14. The first is the primary zone 12 where fuel 15 and air 51 are burned under normal conditions to create primary heat for transfer to the product. In the second zone, or the reburn zone 13, a small amount of reburn fuel 17, commonly, natural gas, is injected in the downstream exhaust 18, which includes primary NO$_x$ from the primary zone 12 to drive the overall stoichiometry slightly fuel rich. Depending upon the primary zone stoichiometry, the amount of reburning fuel 17 required is about 10 to 20 percent of the primary zone fuel heat input.

As shown in FIG. 1B, which generally sets forth the NO destruction pathway in the gas reburn process 11, hydrocarbon radicals formed from reburn fuel 17 in the fuel rich reburn zone, primarily CH species, react with NO formed in the primary zone 12 to form other reduced nitrogen species, such as HCN and NH$_3$. Once formed, these species rapidly react with the remaining primary NO molecules to form molecular nitrogen (N$_2$).

Following the reburn zone 13, additional combustion air, or overfire air 21, is injected into the downstream exhaust 22, which includes NO$_x$ and N$_2$ gases, of the reburn zone 13 in order to complete oxidation of the reburn fuel 17. In the third zone, or the burnout zone 14, any remaining reduced nitrogen species are converted to molecular nitrogen or back to NO, as indicated by reference numeral 23.

Extensive bench-and pilot-scale studies have quantified the impacts of process parameters on reburning effectiveness. As examples in this regard, consider Greene et al., "Bench Scale Process Evaluation of Reburning for In-Furnace NO$_x$ Reduction," ASME Journal of Engineering for Gas Turbines and Power, Vol. 108, pp. 450–454, 1986, and Chen et al., "Bench and Pilot Scale Process Evaluation of Reburning for In-Furnace NO$_x$ Reduction," Twenty-First Symposium (International) on Combustion, The Combustion Institute, pp. 1159–1169, 1986. Although a wide range of process parameters influence overall NO$_x$ reductions and should be specified in a reburning application, not all of the parameters are of first order importance. Studies have shown that the performance of the reburn process 11 of FIG. 1A is primarily controlled by the stoichiometric ratio (SR) of the reburn and burnout zones 13, 14, mixing of gases in the zones 13, 14, the temperature of the zones 13, 14, and the initial NO$_x$ level. In essence, long reburn/overfire air zone residence times, high temperature combustion gases, and high initial NO$_x$ all work to enhance the NO$_x$ reduction achievable with gas reburning. These characteristics are well matched in glass furnaces because of their typical operating conditions and the large post-melter cavities of the furnace port and regenerator crown.

Another key consideration in the application of the gas reburn process 11 to glass furnaces is the desire to be able to apply the process 11 in a retrofit situation where the furnace does not need to be shut down to install the reburning system. To accomplish this goal, an approach to applying the reburn process 11 was developed, where the reburn fuel 17 is added in the port region following the melt, and the overfire air is added into the crown region above the regenerator. The foregoing technique is described in J. Pont et al., "Glass Tank NO$_x$ Emission Control With Gas Reburn," publication by Gas Research Institute, March 1994. Introduction of the reburn fuel and overfire air streams in these areas minimizes the retrofit requirements and would permit a reburning system to be installed while the furnaces is in operation, but raises at least one key process issue: adequate mixing of gases in the reburn and burnout zones 13, 14.

When the gases are not adequately mixed in the reburn and burnout zones 13, 14, there is a risk of degradation in furnace structure resulting from heat pockets. Furthermore, without proper mixing, a proper stoichiometric reaction within the zones 13, 14 is difficult to achieve, resulting in undesirably high NO$_x$ concentrations within the ultimate exhaust of the glass furnace. Finally, it is undesirable to enhance mixing by merely adding numerous superfluous reburn and overfire air jets, because an excessive number of these jets results in unwarranted expense associated with installation of the jets and with a possible increase in consumption of reburn fuel, e.g., natural gas.

Thus, heretofore unaddressed need exists in the industry for a method for insuring adequate mixing of gases in a glass furnace that implements a reburning process.

SUMMARY OF THE INVENTION

The present invention provides a novel method for insuring adequate mixing of gases in a glass furnace that implements a reburn process. The novel mixing method can be broadly summarized as follows: passing a combustible fuel to a primary zone and igniting the fuel in the primary zone; passing an exhaust from the primary zone to a reburn zone; injecting reburn fuel into the reburn zone to generate a first gas mixture so that at a first measurement plane within the gas path of the first gas mixture residing substantially at or near an exit to the reburn zone, the extent of mixing is characterized by a first coefficient of variation (COV) that is less than about 0.4; passing the first gas mixture from the reburn zone exit to a burnout zone; and injecting overfire air into the burnout zone to generate a second gas mixture so that at a second measurement plane within the gas path of the second gas mixture residing substantially at or near an exit of the burnout zone, the extent of mixing is characterized by a second COV that is less than about 0.4.

Another advantage of the mixing method is that the occurrence of fuel-rich heat pockets is minimized.

Another advantage of the mixing method is that the risk of degradation of furnace structure is minimized due to better mixing in the reburn and burnout zones and a reduction in heat or unburned combustion gas pockets resulting therefrom.

Another advantage of the mixing method is that optimized mixing in the reburn and burnout zones ensures a proper stoichiometric reaction within the zones, resulting in more efficient reduction of $NO_x$ concentrations within the ultimate exhaust of the glass furnace.

Another advantage of the mixing method is that the method can be utilized in connection with any type of reburning glass furnace, including but not limited to, reburning furnaces for flat glass and container glass.

Another advantage of the mixing method is that the method makes it possible to construct a reburning glass furnace that minimizes nitrogen oxide ($NO_x$) emissions, while also minimizing the cost of the reburn process, particularly, the number of requisite reburn and overfire air jets as well as reburn fuel. In other words, the novel reburning glass furnace strikes an optimum balance between a reduction in nitrogen oxide ($NO_x$) emissions and the cost of the reburn process, particularly, the number of requisite reburn and overfire air jets as well as reburn fuel. In this regard, the glass furnace has a combustion housing defining (1) a primary zone for receiving combustible fuel, (2) a reburn zone connected to the primary zone for receiving exhaust from the primary zone and reburn fuel to generate a first gas mixture, and (3) a burnout zone connected to the reburn zone for receiving the first gas mixture and overfire air to generate a second gas mixture that has substantially reduced nitrogen oxide contents. A reburn jet(s) provides the reburn fuel to the reburn zone, and an overfire air jet(s) provides overfire air to the burnout zone.

Significantly, the reburn jet(s) in the furnace injects reburn fuel with sufficient momentum (J) so that a first measuring plane of the first gas mixture residing substantially at an exit to the reburn zone is characterized by a first COV of about 0.4. The momentum J is affected by the size of the jet outlet(s), the location of the jet(s), and the angle of the jet(s). Furthermore, the overfire air jet(s) injects air with a sufficient momentum so that a second measuring plane of the second gas mixture residing substantially at an exit of the burnout zone is characterized by a second COV that is 0.4. Again, the momentum J is affected by the size of the jet outlet(s), the location of the jet(s), and the angle of the jet(s). As a result of the foregoing, adequate mixing of the gases in the reburn and burnout zones is achieved with minimal jet requirements so as to reduce costs associated with the jets themselves as well as reburn fuel.

Furthermore, regenerators may be employed adjacent to the primary zone and the burnout zone in the foregoing reburning glass furnace. With regenerators employed, the flow of gases is reversed periodically so as to heat the incoming combustible fuel.

Other features and advantages of the present invention will become apparent to one with skill with in the art of applying examination of the following drawings and detailed description. It is intended that all such additional features and advantages be included herein within the scope of the present invention, as is defined in the claims.

BRIEF DESCRIPTION OF THE DRAWINGS

The present invention can be better understood with reference to the following drawings. The drawings are not necessarily to scale, emphasis instead being placed upon clearly illustrating principles of the present invention. Furthermore, like reference numerals designate corresponding throughout the several views.

DETAILED DESCRIPTION

Generally, the mixing method of the present invention is applicable to any type of glass furnace that employs a reburn process, including particularly both the flat glass and container reburning glass furnaces. When the novel mixing method is employed in a reburning glass furnace, the reburning glass furnaces efficiently minimize nitrogen oxide emissions while minimizing the cost of the reburn process, particularly, the cost associated with requisite reburn and overfire air jets as well as reburn fuel.

Figure 2:
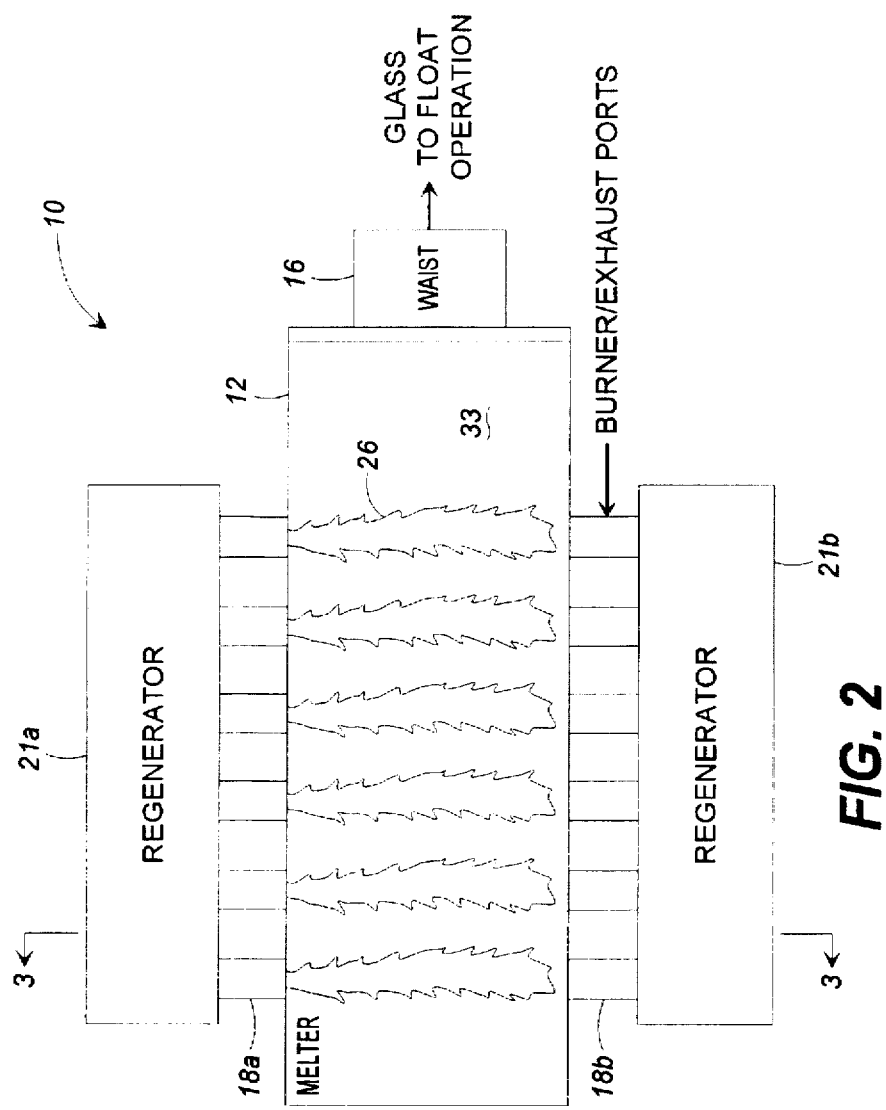
FIG. 2 is a plan view of a flat glass furnace in accordance with the present invention.
Figure 3:
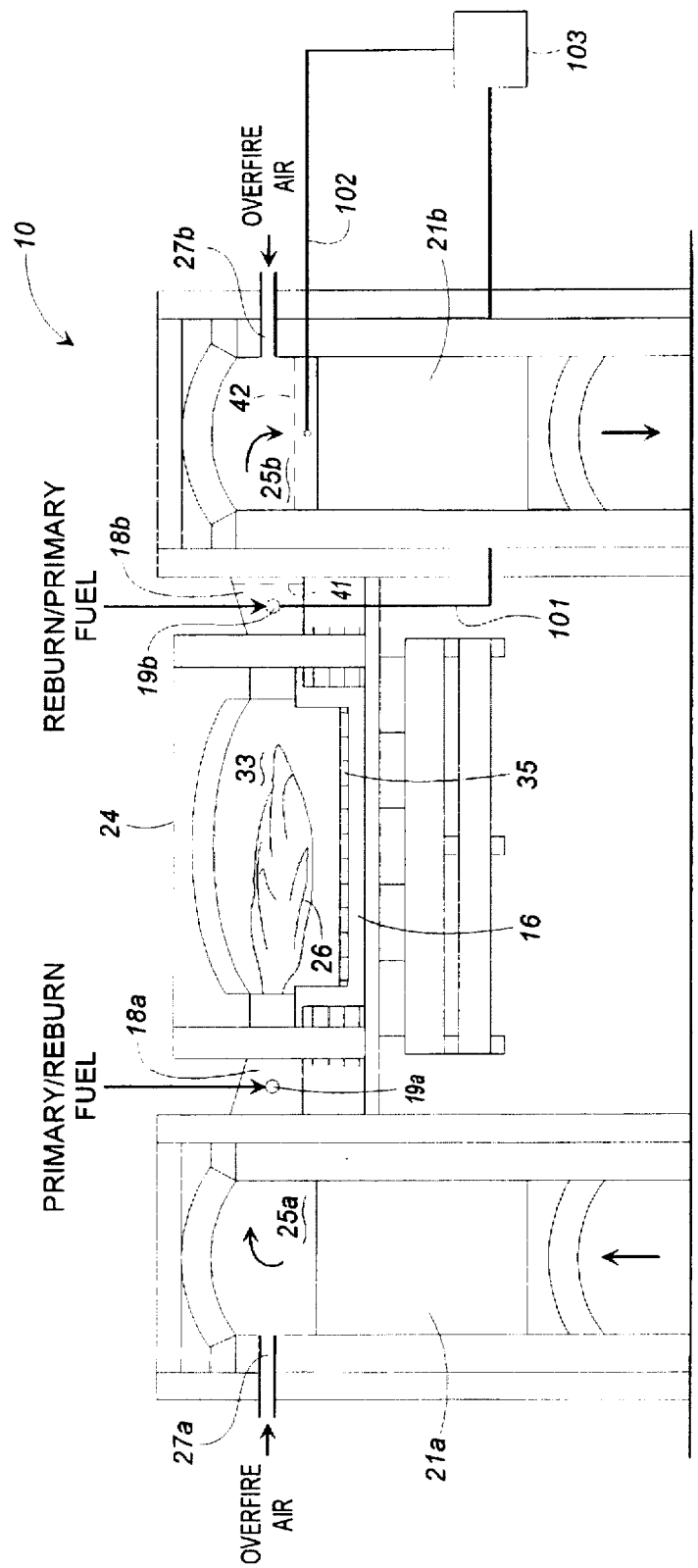
FIG. 3 is a cross-sectional side view of the flat glass furnace of FIG. 2 taken along line 3—3 in FIG. 2.

A flat glass furnace 10 in accordance with the present invention is shown in FIGS. 2 and 3. The flat glass furnace 10 is constructed, in general, as a conventional flat glass furnace is constructed, but the novel flat glass furnace 10 includes a reburning system, as will be further apparent from the discussion hereafter. In fact, the flat glass furnace 10 can be built by retrofitting the reburning technology, as described hereafter, into a conventional flat glass furnace.

Figure 1A:
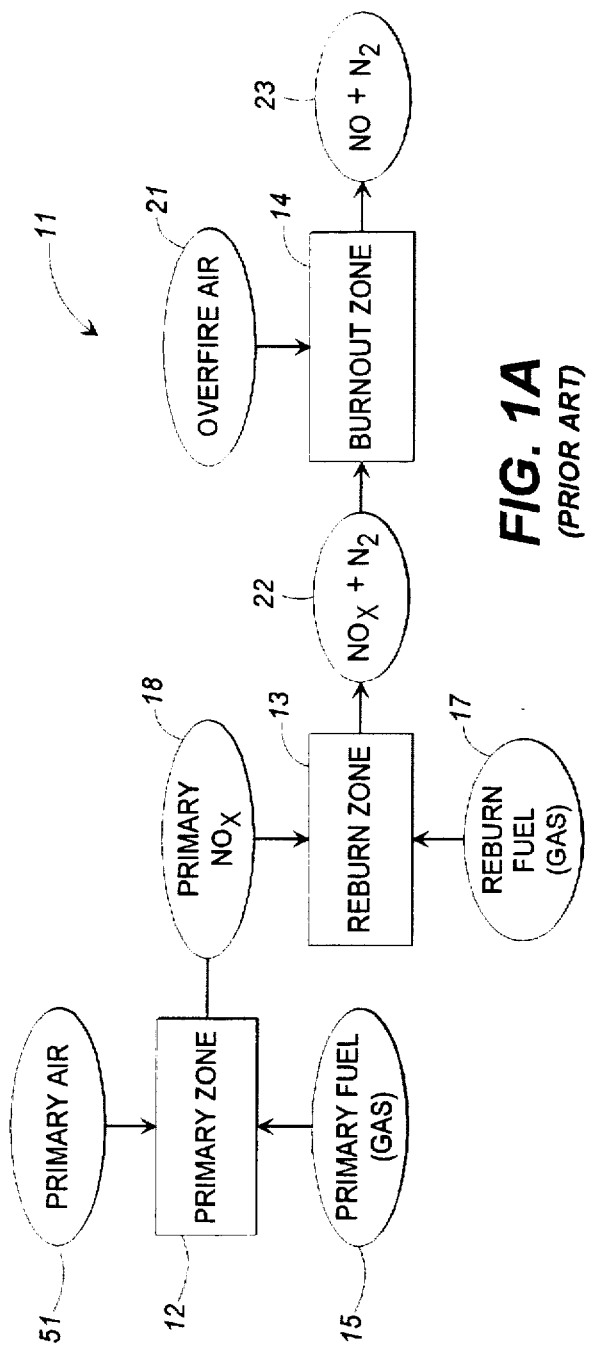
FIG. 1A is a block diagram illustrating the process of gas reburning.

The flat glass furnace 10 utilizes the float glass method rather than the energy and labor intensive roll glass method, which methods are well known in the art. Moreover, the flat glass furnace 10 is of an side port design, which is a common firing configuration for flat glass furnaces. As illustrated in FIGS. 2 and 3, structurally, the flat glass furnace 10 comprises a housing, generally brick, which defines the respective primary, reburn, and burnout zones 12, 13, 14 (FIG. 1A). The housing includes a melter 24 which is generally rectangular with a crown top and which defines an internal combustion chamber 33 (i.e., the primary zone 12 of FIG. 1A) where primary combustion occurs, as indicated by flames 26. The melter 24 provides heat to flat glass which flows within a waist 16, as indicated by the reference arrow in FIG. 2. Heat is transferred to the waist 16 from the internal combustion chamber 33 through a bridge wall 35, as best shown in FIG. 3. Ultimately, the waist 16 carries the glass to a refiner (not shown for simplicity).

On either side of the melter 24 is a plurality of ports 18a, 18b, which serve alternatively as burner ports and exhaust ports. Each of the ports 18a, 18b is equipped with one or more jets 19a, 19b, which in the preferred embodiment, alternately act to provide primary gas (e.g., natural gas) to the melter 24 and to provide reburn gas for the reburn zone (FIG. 1A). One of the ports 18a, 18b at a given time defines the reburn zone (FIG. 1A), while the other mixes primary gas with incoming air, depending upon the furnace cycle. Obviously, it would be possible, although more costly, to have separate jets for the primary gas and reburn fuel.

The ports 18a, 18b are connected to respective chambers 25a, 25b that are defined by an elongated generally rectangular structure with a crown top, as shown in FIGS. 2 and 3. One of these chambers 25a, 25b defines the burnout zone (FIG. 1A), while the other passes combustion air toward the melter 24, depending upon the furnace cycle. To this end, one or more overfire air jets 27a, 27b are disposed in each chamber 25a, 25b, as shown in FIG. 3, for injecting overfire air.

Regenerators 21a, 21b are connected to the chambers 25a, 25b, respectively, for recovering heat from the melter flue gases and providing high air preheat temperatures for incoming combustion air. In essence, the regenerators 21a, 21b maintain high temperatures in the melter 24 and improve thermal efficiency. Each regenerator 21a, 21b comprises a stack of refractory bricks that are disposed in a checker configuration, which is well known in the art, and heat is transferred to the bricks.

The operation of the furnace 10 and implementation of the associated gas reburning methodology is as follows with reference to FIG. 3. In general, the gas flow of the furnace 10 is reversed periodically, for example, every 15 to 20 minutes, so that there are generally two cycles associated with the furnace 10.

During one of the cycles, as shown by reference arrows in FIG. 3, air enters into the furnace housing from the bottom of the regenerator 21a, into and through the brick matrix of the regenerator 21a, and passes into the set of ports 18a. Fuel combustion gas (e.g., natural gas) is injected into the ports 18a by one or more jets 19a. The gas mixture is ignited so that a flame 26 appears within the melter 24. The average combustion air free temperature is about 2100° F. in the preferred embodiment, but this temperature may be varied. The melter 24 defines the primary zone (FIG. 1A). The products of combustion pass into the ports 18b. The average gas temperature is about 2850° F. at the ports 18b in the preferred embodiment. Reburn fuel is injected into the products of combustion, downstream of the primary zone, via one or more jets 19b situated within the ports 18b. Reburning takes place at this point. Specifically, $NO_x$ from the primary zone reacts with hydrocarbon fragments formed during oxidation of the reburn fuel and is reduced to molecular nitrogen. The gas mixture then enters the burnout zone in the chamber 25b which is defined above the regenerator 21b. Overfire air is injected into the gas mixture within the chamber 25b via jet 27b to produce overall fuel-lean conditions and to oxidize carbon monoxide and any remaining fuel fragments from the reburn zone. The gas mixture then flows through the brick matrix of the regenerator 21b and out from the furnace 10 through the bottom of the regenerator 21b.

During the other alternate furnace cycle, the gas flow of the furnace 10 is in the reverse direction as that described above. Specifically, air passes through the regenerator 21b, is preheated in the regenerator 21b as a result of the previous furnace cycle. In the preferred embodiment, over this cycle, the average air preheat temperature is about 2100° F. The air is then mixed with primary fuel within the ports 18b that is fed from the jets 19b. The gas mixture is passed from the ports 18b to the melter 24, where ignition occurs to produce flames 26. The products of combustion passes through ports 18a, where reburn fuel is injected into the exhaust, and the reburned gas mixture is communicated to the chamber 25a. In the chamber 25a, overfire air is injected via the one or more jets 27a. The resultant gas mixture is passed through the regenerator 21a and out from the furnace 10 through the bottom of the regenerator 21a. Finally, the previous furnace cycle is commenced again, and the aforementioned dual cycle scheme continues.

Figure 4:
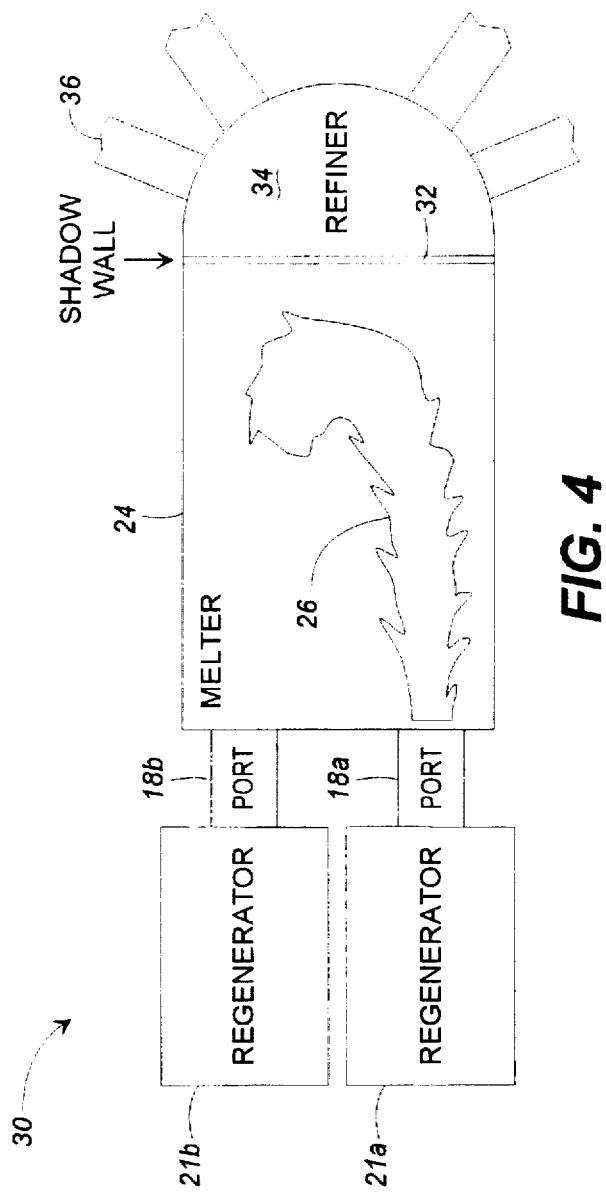
FIG. 4 is a plan view of a container glass furnace in accordance with the present invention.

A container glass furnace 30 in accordance with the present invention is shown by way of a top view in FIG. 4. The container glass furnace 30 is of an end port design, which is a common well known firing configuration for container glass furnaces. As shown in FIG. 4, the container glass furnace 30 is built with similar parts and construction as the flat glass furnace 10. For simplicity, the discussion set forth previously regarding parts with reference numerals that correspond to those of the furnace 30 is incorporated herein by reference, and merely some of the differences in structure between the furnaces 10, 30 are discussed hereafter.

The container glass furnace 30 uses regenerators 21a, 21b that are situated substantially adjacent to each other and has ports 18a, 18b that are substantially parallel to each other, as compared to an opposing relationship as in the furnace 10 (FIG. 2 and 3). Heat is transferred from the melter 24 through a shadow wall 32 to a refiner 34, with a semicircular top view as shown in FIG. 4, containing the container glass. The container glass is melted in the melter 24 and distributed to a plurality of dispensing channels 36 extending from the side walls of the refiner 34, as is illustrated in FIG. 4.

In addition to firing natural gas within the melter 24 in the furnace 30, some level of electric boosting is preferably utilized. Over the cycle, the average air preheat temperature achieved by the regenerators 21a, 21b is approximately 2100° F., and the average exhaust gas temperature at the exhausting port 18a, 18b is about 2700° F.

The operation of the container glass furnace 30 is generally the same as that for the flat glass furnace 10, and accordingly, the discussion relative to the operation of the furnace 10 is incorporated herein by reference and is equally applicable to the furnace 30.

Figure 1B:
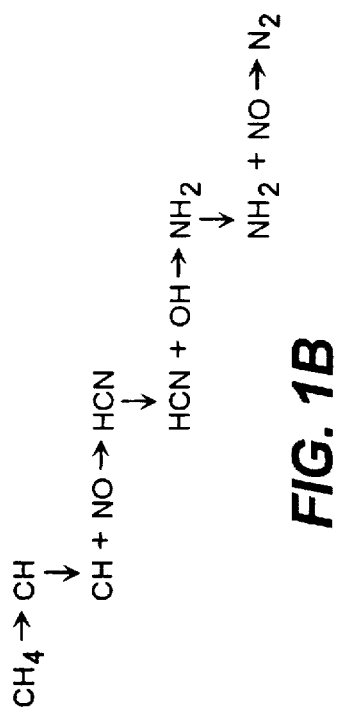
FIG. 1B is a chemical reaction diagram illustrating the NO destruction pathway corresponding to the gas reburning process of FIG. 1A.
Figure 5:
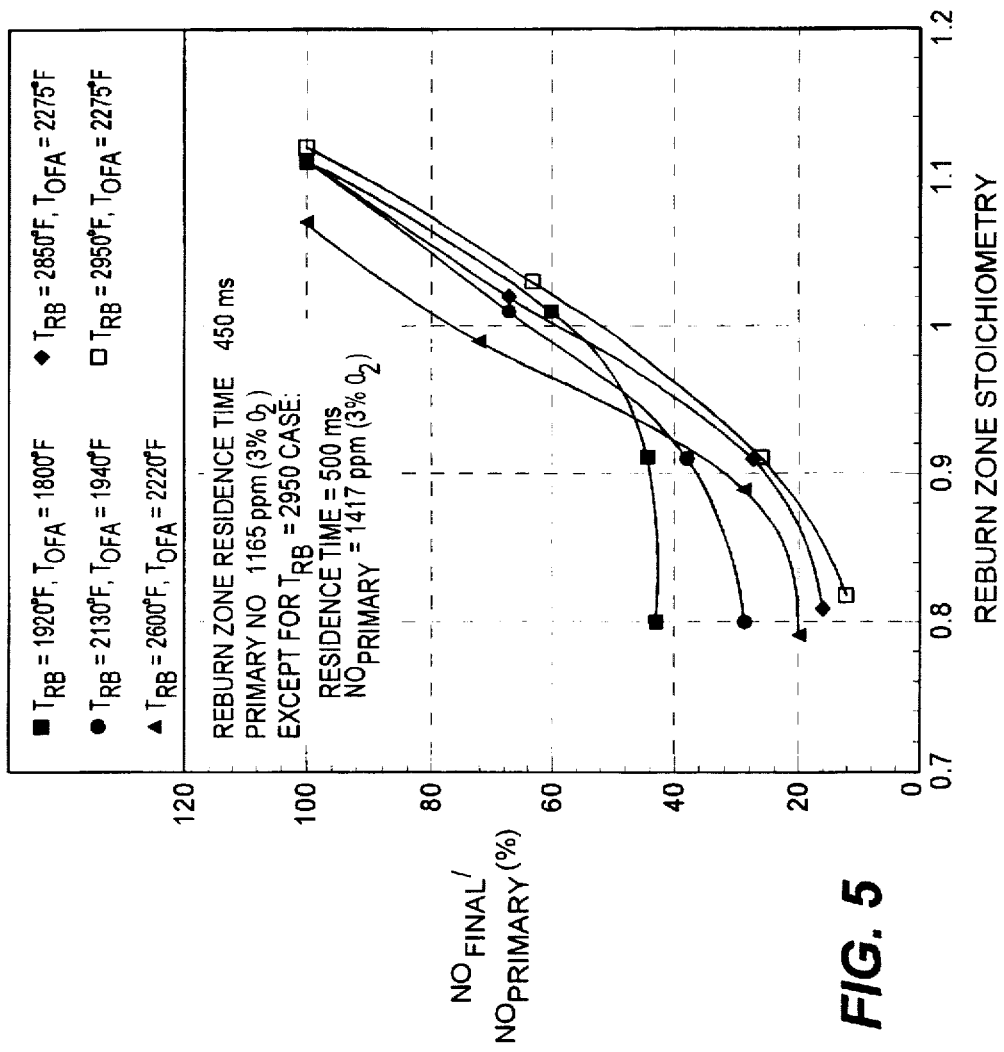
FIG. 5 is a graph of $NO_{final}/NO_{primary}$ (%) versus reburn zone stoichiometry illustrating the impact of reburn zone stoichiometry on process performance in the glass furnaces of FIGS. 2 and 4.

It has been determined by extensive research that the reburn process as applied to glass furnaces and the resultant $NO_x$ level at the furnace exhaust is primarily influenced by the stoichiometric ratios ($SR_1$, $SR_2$, and $SR_3$, respectively) of the primary, reburn, and burnout zones 12, 13, 14 (FIG. 1), fuel mixing in the reburn and burnout zones 13, 14, temperatures in the zones 13, 14, and the initial $NO_x$ level. Long zone residence times, hot combustion gases, and high initial $NO_x$ all work to enhance the $NO_x$ reduction achievable with gas reburning. In the context of this document, stoichiometry is defined as the ratio of the total gas supplied to a zone to the total stoichiometrical requirements for complete combustion of the fuel in the zone. The impact of reburn zone stoichiometry on $NO_x$ control performance is shown in FIG. 5. In this figure, the emissions results are plotted as the ratio of final $NO_x$ emissions to initial $NO_x$ emissions from the primary zone. The $NO_x$ reduction (control) due to reburning is the difference between 100% and the value of this ratio.

As shown in FIG. 5, reburning performance improves as the reburn zone stoichiometry decreases. Whereas previous experimental studies have shown that reburning performance at lower temperature does not significantly improve at reburn zones where the stoichiometry is below 0.9, the results of the studies by the inventors indicate that higher $NO_x$ can be achieved at high $NO_x$ and high temperature conditions by reducing the reburn zone stoichiometry. For typical glass furnace conditions of 1200 ppm $NO_x$, and gas temperatures of close to about 2800° F., these results indicate that operating at a reburn zone stoichiometry over approximately 0.80 would be expected to provide a control level of up to about 80%. From the foregoing studies, it has been determined that the stoichiometric ratio for the primary, reburn, and burnout zones in the preferred embodiment should be approximately as follows: 1.01, 0.90 and 1.10.

In order to assure the aforementioned stoichiometries in the respective zones, in order to maximize $NO_x$ reduction for a given level of reburn fuel, and in order to reduce the risk of heat pockets and degradation in furnace structure, proper mixing should be achieved in the reburn and burnout zones 13, 14 (FIG. 1A). Specifically, the reburn fuel injected by the jets 19a, 19b into the exhaust from the melter 24 should be sufficiently mixed. Moreover, the overfire air injected by the jets 27a, 27b into the exhausts from the reburn zone should be sufficiently mixed to assure appropriate oxidation of carbon monoxide and any remaining fuel fragments.

In order to insure appropriate mixing in the reburning glass furnaces 10, 30, the inventors developed a novel mixing method, based upon extensive research and experimentation. The mixing method can be performed on a subscale glass furnace model used for design purposes, or the mixing method can be performed on a full scale production furnace itself. For purposes of discussion, the mixing method will be described with reference to the full scale production furnace of FIG. 3. Pursuant to the mixing method, a first measurement plane 41 is defined just prior to the overfire air zone, i.e., just before the chamber 25a, 25b, and after the one or more reburn jets 19a, 19b, as is illustrated in FIG. 3. Further, pursuant to the measuring scheme, a second measurement plane 42 is defined just after the reburn zone, i.e., just after the respective chamber 25a, 25b, and after the one or more overfire air jets 27a, 27b, as is further shown in FIG. 3. Probes 101 and 102 are placed at various positions in each of the planes 41, 42, respectively, and multiple gas concentrations are measured. At the first measurement plane 41, the ratio of reburn fuel to primary combustion exhaust is determined with the probe 101, and at the second measurement plane 42, the ratio of overfire air to reburn zone exhaust is determined with the probe 102. The probes can be any suitable device for measuring the foregoing gases, a number of which are commercially available. Hence, the measurement planes 41, 42 represent a grid, or matrix, of samples x, where x is the ratio at each data point within the measurement plane 41, 42 as described in greater detail below, a means 103 responsive to the probes 101 and 102 performs calculations to establish coefficients of variation in each of the planes 41, 42 to accomplish the purposes of the present invention.

Figure 6:
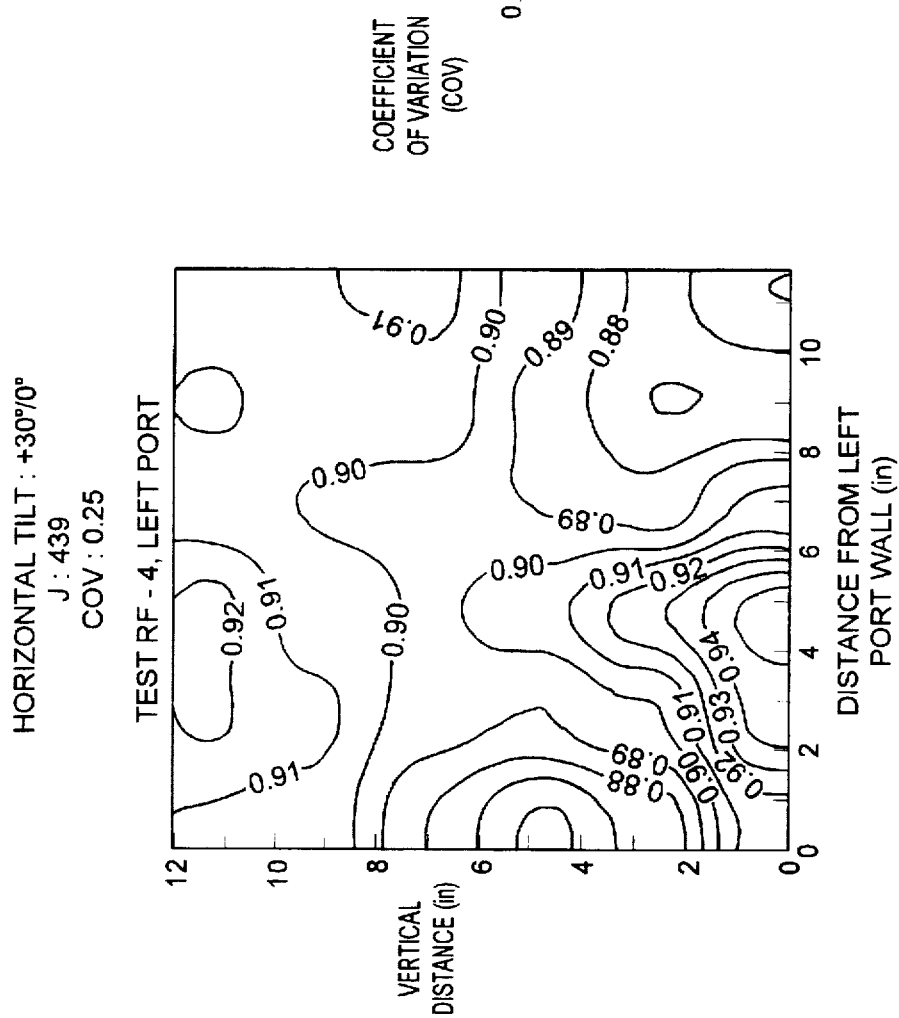
FIG. 6 is a graph showing an example of mixing at a measurement plane.

By way of an example, FIG. 6 graphically illustrates the variation in mixing associated with the gas mixture at the first measurement plane 41, situated near the exit to the reburn zone and just before the overfire air zone. As will be further described hereinafter, the mixing as shown in FIG. 6 is acceptable, as long as the coefficient of variation (i.e., 0.25) is less than 0.4. In FIG. 6, each sample x has been converted to a local stoichiometric ratio as follows:

$$Local\ SR = SR \times (x/x_{wm}) \qquad (1)$$

where x is the sample, $x_{wm}$ is the well mixed sample, and SR is the design stoichiometric ratio in the reburn zone. As is apparent from FIG. 6, if adequate gas mixing is not achieved, then certain areas will have an inordinate amount of combustible fuel that can lead to hot pockets, and the aforementioned SRs for the zones cannot be realized.

After the first and second measurement planes 41, 42 have been established, a coefficient of variation (COV) is determined for each of the planes 41, 42. The COV is essentially a concept that has been developed by the inventors and that is basically a measure of the mixing at the planes 41, 42. The COV is computed as follows:

$$SD = \left[ \sum_{i=1}^{n} (x_i - \bar{x})^2 \right]^{1/2} \qquad (2)$$

$$\bar{x} = \frac{\sum_{i=1}^{n} x_i}{n} \qquad (3)$$

$$COV = 1 - SD \qquad (4)$$

where x is a ratio at a given point within a measurement plane, $\bar{x}$ is the mean of all ratios measured within a measurement plane, and SD is the standard deviation of all the ratios ($x_i \ldots x_n$) measured within a measurement plane. The COV is a unitless measure. In general, the lower the COV, the better the mixing. However, in order to have COV approach zero, an inordinate number of reburn jets 19a, 19b for the reburn zone and an inordinate number of overfire air jets 27a, 27b for the overfire air zone would be required, thereby resulting in excessive costs.

Based upon extensive research and experimentation, the inventors have determined that for appropriate mixing, the COV should be at least less than 0.4 and optimally around 0.15. However, it is undesirable to lower the COV to near 0.15 by adding numerous reburn and overfire air jets, because of the expense associated with installation of the jets as well as with consumption of reburn fuel, e.g., natural gas. To strike an optimum balance between a reduction in nitrogen oxide ($NO_x$) emissions and the cost of the jets and fuel associated with the reburn process, a COV of about 0.4 should be achieved.

To determine the acceptable jet configuration for achieving a COV of about 0.4, a momentum flux ratio J was determined at planes 41, 42. The momentum flux ratio J is essentially the ratio of jet nozzle fluid momentum to the total momentum of the fluids passing through the planes 41, 42. Mathematically, the foregoing relationship can be expressed as follows: $J = e_o v_o / e^2{}_1 v^2{}_1 = mv$, where $e_o$ and $e^2{}_1$ are the fluid density of, respectively, the jet fluid and total fluid (jet fluid and other fluid combined), $v_o$ and $v^2{}_1$ are the fluid velocities of respectively the jet fluid and total fluid, m is the mass of the total fluid, and v is the velocity of the total fluid. In the preferred embodiment, the momentum flux ratio J for each plane is computed, based upon the previous equation, from the following physical specifications: the number of jets, the known mass of the gas mixture, the dimensions of the outlet nozzles associated with each jet, the flow rate from each jet, the angle of each jet relative to the planes 41, 42, and the position of each jet relative to the planes 41, 42.

Figure 7:
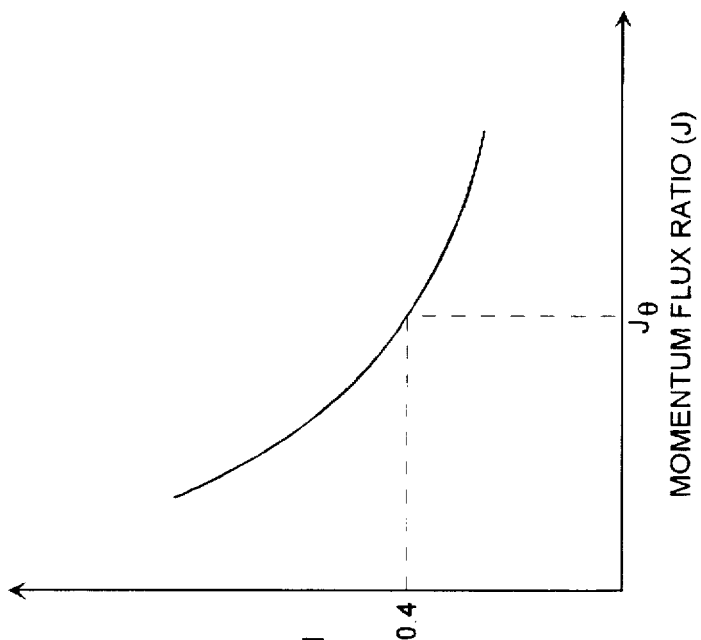
FIG. 7 is a graph showing how the momentum flux ratio (J) (and jet configuration) is determined based upon a coefficient of variation (COV) that is less than or equal to 0.4, but preferably about 0.4.

Next, as shown in FIG. 7, for each of the planes 41, 42, the momentum flux ratio J is compared graphically to COV at the respective plane 41, 42 in order to determine the appropriate momentum flux ratio J for a COV of about 0.4. In FIG. 7, the momentum flux ratio $J_O$ yields a COV of about 0.4, and therefore, $J_O$ strikes the optimum balance between cost and performance, and moreover, any value of J greater than or equal to $J_O$ is an acceptable J in terms of mixing.

Once an acceptable momentum flux ratio J has been determined, then the jet configuration for the furnace 10, 30 directly follows therefrom, because each J of the graph (FIG. 7) corresponds to a particular jet configuration. The jet configuration for each zone 13, 14 includes: the number of jets, the dimensions of the outlet nozzles associated with each jet, the flow rate from each jet, the angle of each jet relative to the planes 41, 42, and the position of each jet relative to the planes 41, 42.

Figure 8:
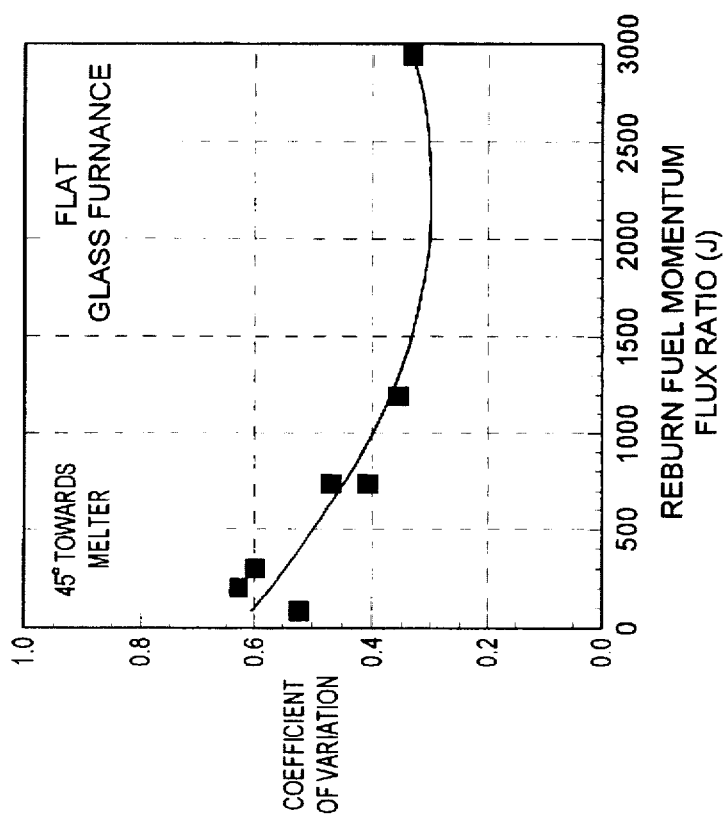
FIG. 8 is a graph of COV versus reburn fuel J corresponding to an example of the flat glass furnace of FIG. 2.

FIGS. 8 through 11 show examples of a comparison between COV and J to determine the optimum J. FIG. 8 shows a graph of COV versus reburn fuel momentum flux ratio J at the plane 41 in a flat glass furnace 10 (side port type; FIGS. 2 and 3). In this example, the primary jet locations and directions were also used for the reburn jets. Specifically, there were two jets disposed opposite each other in each port and directed at an angle of about 45 degrees toward the melter 24. Experimentally determined sample points are indicated by the symbol ■ in FIG. 8. As further shown in FIG. 8, the momentum flux ratio J can be about 1000 to achieve a COV of about 0.4. Thus, the jet configuration corresponding with the momentum flux ratio J of about 1000 should be selected for the furnace 10 to strike an optimum balance between cost and $NO_x$ reduction.

Figure 9:
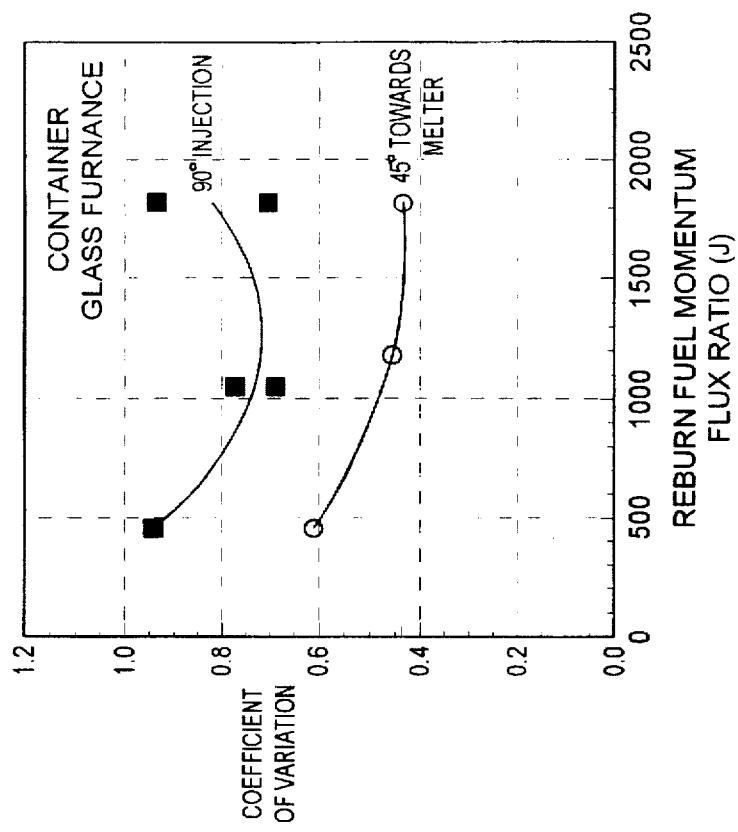
FIG. 9 is a graph of COV versus reburn fuel J corresponding to an example of the container glass furnace of FIG. 4.

FIG. 9 shows a graph of COV versus reburn fuel momentum flux ratio J at the plane 41 in the container glass furnace 30 (end port type; FIG. 4). In this example, the primary jets were also used as the reburn jets. Specifically, there were two jets disposed opposite each other in each port. Graph traces are indicated for the situation where the jets are disposed to inject fluid at an angle of about 90° (perpendicular) to the flow towards the melter 24 and at an angle of about 45° to the flow towards the melter 24. In FIG. 9, experimentally-determined sample points for the former are designated by the symbol ■, and sample points for the latter are designated by the symbol ○. As is apparent from FIG. 9, both of the foregoing jet configurations are unacceptable because the lowest COV that can be achieved for the 90° (perpendicular) injection is about 0.72 and the lowest COV that can be achieved for the 45° injection is about 0.44. Hence, the number of jets, the jet angles, jet flow rates and/or position of the jets should be modified until a COV of around 0.4 is obtained.

Figure 10:
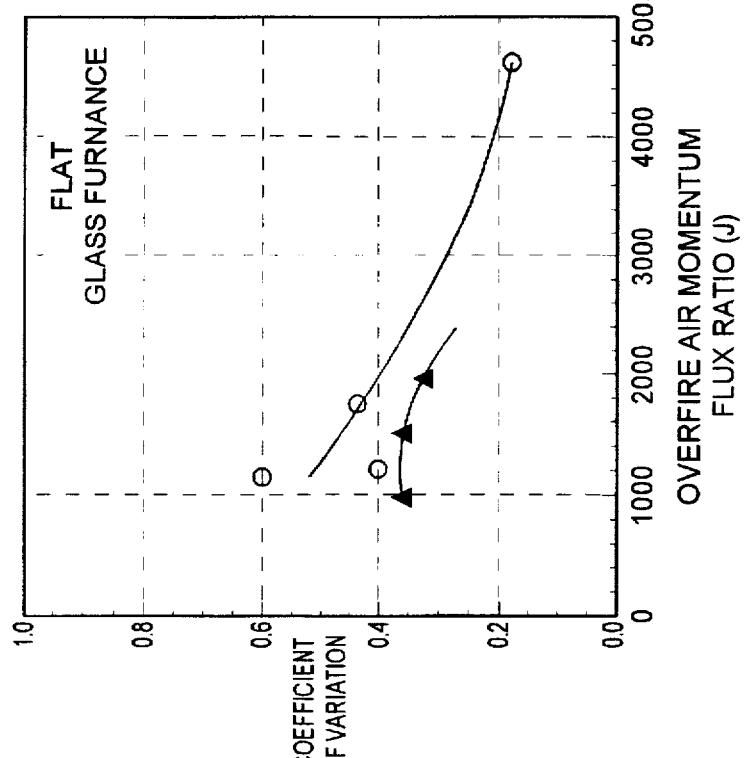
FIG. 10 is a graph of COV versus overfire air J corresponding to an example of the flat glass furnace of FIG. 2.

FIG. 10 shows a graph of COV versus overfire air momentum flux ratio J at the measurement plane 42 in the side port fired flat glass furnace 10 (sample points denoted by symbols ▲; furnace in FIGS. 2 and 3) as well as a side port fired container glass furnace (sample points denoted by symbols ○; not shown in any figures) with a regenerator aspect ratio (width to length) configuration, which is different from that of a side port fired flat glass design and which is well known in the art. In this example, there was a single overfire air jet 27a, 27b directed at an angle of about 90 degrees toward the flow of gasses passing through the respective chamber 25a, 25b and positioned at about 1 feet above the regenerator 21a, 21b. A separate trace is shown in FIG. 10 for the side port furnace 10 and for the container furnace. As is apparent from FIG. 10, for the container furnace, the momentum flux ratio J is optimally about 2000 in order to achieve a COV of 0.4. For the side port furnace 10, the momentum flux ratio J can be 1000 and perhaps even lower to obtain a COV of under 0.4.

Figure 11:
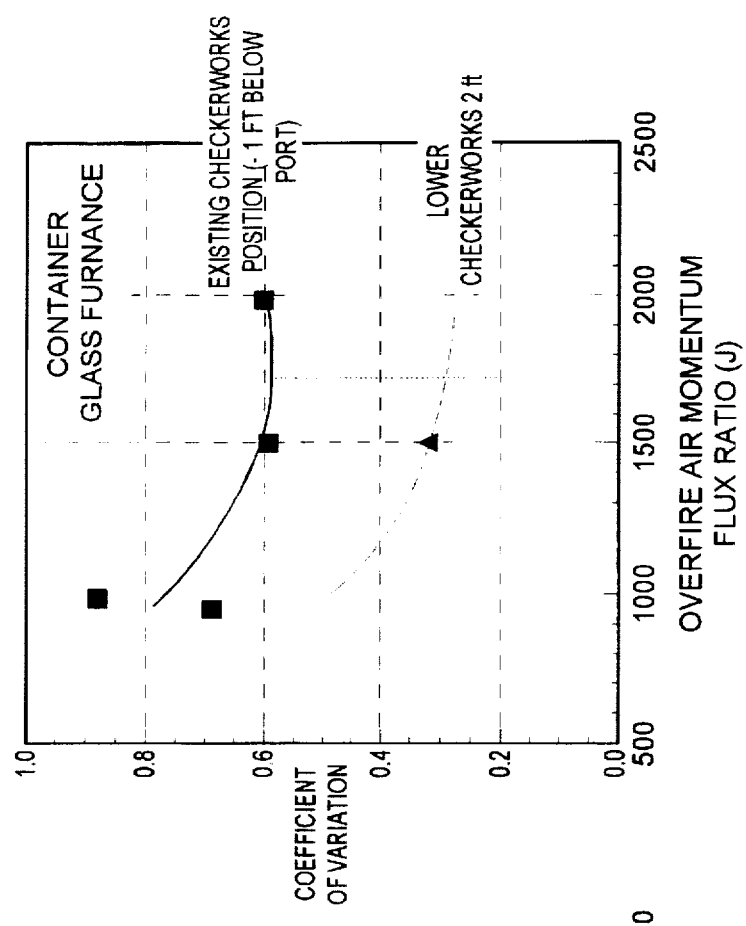
FIG. 11 is a graph of COV versus overfire air J corresponding to an example of the container glass furnace of FIG. 4.

FIG. 11 graphically shows COV versus overfire air momentum flux ratio J at the plane 42 in an end port fired container glass furnace 30 (FIG. 4). In this example, one trace (sample points denoted by symbols ■) shows the results when overfire air jets 27a, 27b were directed at an angle of about 90 degrees toward the flow of gasses passing through the respective chamber 25a, 25b and positioned at about 2 feet above the regenerator 21a, 21b. A separate trace (sample points denoted by symbols A) is shown in FIG. 11 for the 1 ft. configuration and for the 2 ft. configuration. As is apparent from FIG. 11, the 1 ft. configuration is unacceptable as a COV of 0.4 cannot be obtained. As for the 2 ft. configuration, a momentum flux ratio J of about 2000 would be acceptable to obtain a COV of 0.4. Thus, the jet configuration corresponding with the momentum flux ratio J of about 2000 should be selected for the furnace 30.

In concluding the detail description, it should be noted that it will be obvious to those skilled in the art that many variations and modifications can be made to preferred embodiments without substantially departing from the principles of the present invention. All such variations and modifications are intended to be included herein within the scope of the present invention, as set forth in the following claims. Further, in the claims hereafter, any means element or step in a means-plus-function clause or step-plus-function clause, respectively, are intended to include any means (e.g., any structures, materials, etc.) or step for performing any recited function, respectively.

Wherefore, the following is claimed:

1. A glass furnace for implementing a reburn process for efficiently minimizing nitrogen oxide emissions while minimizing cost of the reburn process, comprising:
   (a) a combustion housing defining:
   (1) a primary zone for receiving combustible fuel;
   (2) a reburn zone connected to said primary zone for receiving exhaust from said primary zone and reburn fuel to generate a first gas mixture; and (3) a burnout zone connected to said reburn zone for receiving said first gas mixture and overfire air to generate a second gas mixture;

(b) said reburn zone including:

(1) a first gas mixture measurement plane residing substantially at an exit to said reburn zone; and (2) a first movable probe disposed in said first gas mixture measurement plane, said first probe for measuring a concentration of said first gas mixture; and (3) means responsive to said first probe for providing said reburn fuel to said reburn zone so that said first gas mixture at said first gas mixture measurement plane is characterized by a first coefficient of variation that is about 0.4; and (c) said burnout zone further including;

(1) a second gas mixture measurement plane residing substantially at an exit to said burnout zone;

(2) a second movable probe disposed in said second gas mixture measurement plane, said second probe for measuring a concentration of said second gas mixture; and (3) means responsive to said second probe for providing said overfire air to said burnout zone so that said second gas mixture at said second gas mixture measurement plane is characterized by a second coefficient of variation that is about 0.4.

2. The glass furnace of claim 1, further comprising:

a first regenerator connected to said housing adjacent to said primary zone; and a second regenerator connected to said housing adjacent to said burnout zone.

3. The glass furnace of claim 2, wherein said reburn zone is defined by a plurality of ports connecting said primary and burnout zones.

4. The glass furnace of claim 1, wherein a portion of said housing which defines said primary zone is constructed and arranged to apply heat to flat glass.

5. The glass furnace of claim 1, wherein a portion of said housing which defines said primary zone is constructed and arranged to apply heat to container glass.

6. The glass furnace of claim 1, wherein each of said first and second coefficients of variation (COV) is computed as follows:

$$SD = \left[ \sum_{i=1}^{n} (x_i - \bar{x})^2 \right]^{1/2}$$

$$\bar{x} = \frac{\sum_{i=1}^{n} x_i}{n}$$

$$COV = 1 - SD$$

where x is a ratio at a given point within each of said measurement planes, $\bar{x}$ is the mean of all ratios measured within each of said measurement planes, and SD is the standard deviation of all the ratios ($x_i \ldots x_n$) measured within a measurement plane.

7. A glass furnace for implementing a reburn process for efficiently minimizing nitrogen oxide emissions while minimizing cost of the reburn process, comprising:

(a) a combustion housing defining:

(1) a primary zone for receiving combustible fuel, (2) a reburn zone connected to said primary zone for receiving exhaust from said primary zone and reburn fuel to generate a first gas mixture; and (3) a burnout zone connected to said reburn zone for receiving said first gas mixture and overfire air to generate a second gas mixture;

(b) said reburn zone including:

(1) a first gas mixture measurement plane residing substantially at an exit to said reburn zone;

(2) a first movable probe disposed in said first gas mixture measurement plane, said first probe for measuring a concentration of said first gas mixture;

(3) means responsive to said first probe for providing reburn fuel to said reburn zone so that said first gas mixture at said first gas mixture measurement plane is characterized by a first gas mixture coefficient of variation that is about 0.4;

(c) said burnout zone including:

(1) a second gas mixture measurement plane residing substantially at an exit to said burnout zone;

(2) a second movable probe disposed in said second gas mixture measurement plane, said second probe for measuring a concentration of said second gas mixture;

(3) means responsive to said second probe for providing overfire air to said burnout zone so that said second gas mixture at said second gas mixture measurement plane is characterized by a second gas mixture coefficient of variation that is about 0.4;

(d) wherein said first and second gas mixture coefficients of variation (COV) are each computed as follows:

$$SD = \left[ \sum_{i=1}^{n} (x_i - \bar{x})^2 \right]^{1/2}$$

$$\bar{x} = \frac{\sum_{i=1}^{n} x_i}{n}$$

$$COV = 1 - SD$$

where x is a ratio at a given point within each of said measurement planes, $\bar{x}$ is the mean of all ratios measured within each of said measurement planes, and SD is the standard deviation of all the ratios ($x_i \ldots x_n$) measured within a measurement plane;

(e) a first regenerator connected to said housing adjacent to said primary zone; and (f) a second regenerator connected to said housing adjacent to said burnout zone.

8. The glass furnace of claim 7, wherein a portion of said housing which defines said primary zone is constructed and arranged to apply heat to a means for transporting flat glass.

9. The glass furnace of claim 7, wherein a portion of said housing which defines said primary zone is constructed and arranged to apply heat to a means for transporting container glass.

10. The glass furnace of claim 7, wherein said reburn zone is defined by a plurality of ports connecting said primary and burnout zones.

* * * * *

UNITED STATES PATENT AND TRADEMARK OFFICE
CERTIFICATE OF CORRECTION

PATENT NO. : 5,795,364
DATED : August 18, 1998
INVENTOR(S) : Payne et al.

It is certified that error appears in the above-identified patent and that said Letters Patent is hereby corrected as shown below:

In column 1, line 53 –"furnace" is corrected to "furnaces".

In column 3, line 1 –"a" is inserted before "heretofore".

In column 4, line 16 –the second appearance of "with" is deleted.

In column 4, lines 16-17 –"of applying" is corrected to "upon".

In column 5, line 4 –"furnaces efficiently minimize" is corrected to "furnace efficiently minimizes".

In column 5, line 19 –"an" is corrected to "a".

In column 5, line 34 –"is" is corrected to "are".

In column 6, line 31 –"and" is inserted after "21b,".

In column 6, line 35 –the second appearance of "is" is corrected to "are".

In column 6, line 38 –"passes" is corrected to "pass".

In column 10, line 22 –"gasses' is corrected to "gases".

In column 10, line 47 –"detail" is corrected to "detailed".

UNITED STATES PATENT AND TRADEMARK OFFICE
CERTIFICATE OF CORRECTION

PATENT NO. : 5,795,364  Page 2 of 2
DATED : August 18, 1998
INVENTOR(S) : Payne et al.

It is certified that error appears in the above-identified patent and that said Letters Patent is hereby corrected as shown below:

In column 11, line 6 —"and" is deleted.

Signed and Sealed this

Nineteenth Day of January, 1999

Attest:

Attesting Officer

*Acting Commissioner of Patents and Trademarks*